(12) United States Patent
Tracy et al.

(10) Patent No.: US 7,219,038 B2
(45) Date of Patent: May 15, 2007

(54) AUTOMATIC PEAK IDENTIFICATION METHOD

(75) Inventors: Eugene R Tracy, Williamsburg, VA (US); Haijian Chen, Williamsburg, VA (US); William E Cooke, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 0 days.

(21) Appl. No.: 11/386,437

(22) Filed: Mar. 22, 2006

(65) Prior Publication Data

US 2006/0217938 A1    Sep. 28, 2006

Related U.S. Application Data

(60) Provisional application No. 60/664,010, filed on Mar. 22, 2005.

(51) Int. Cl.
*G06F 15/00* (2006.01)
*G01J 3/40* (2006.01)

(52) U.S. Cl. ..................... 702/189; 356/303
(58) Field of Classification Search .............. 702/19, 702/189; 356/300, 302, 303; 382/128; 128/922; 250/461.2
See application file for complete search history.

(56) References Cited

U.S. PATENT DOCUMENTS 6,421,553 B1 * 7/2002 Costa et al. .............. 600/476
6,707,548 B2 * 3/2004 Kreimer et al. ............ 356/301
7,031,877 B2 * 4/2006 LeGore et al. ............. 702/181

OTHER PUBLICATIONS

Gulam-Razul et al., Bayesian Deconvolution in Nuclear Spectroscopy Using RJMCMC, 2002 IEEE.*
Yanofsky et al., Determination of the Systematic and Random Measurement Error in an LC-FTICR Mass Spectroscopy Analysis of a Partially Characterized Complex Peptide Mixture, Sep. 1-5, 2004, Proceedings of the 26th Annual International Conference of the IEEE EMBS, pp. 216-219.*
Schwarz-Selinger et al., Analysis of Multicomponent Mass Spectra Applying Bayesian Probability Theory, 2001, Journal of Mass Spectrometry, pp. 866-874.*

* cited by examiner

*Primary Examiner*—John Barlow
*Assistant Examiner*—Toan M. Le

(57) ABSTRACT

The invention described herein details a protocol to improve analysis and peak identification in spectroscopic data. Bayesian methods are used to automatically identify peaks in data sets. After identifying peak shapes, the method tests the hypothesis that a given number of peaks is found within any given data window. If a peak is identified within a given window, then the likelihood function is maximized in order to estimate peak position and amplitude. This process yields a spectrum with high resolution and minimal artifacts. The method described herein is particularly useful for identifying peaks in data sets obtained from spectroscopy.

6 Claims, 3 Drawing Sheets

AUTOMATIC PEAK IDENTIFICATION METHOD

CROSS-REFERENCE TO RELATED APPLICATIONS

The present application claims priority from U.S. Provisional Application Ser. No. 60/664,010, filed Mar. 22, 2005.

STATEMENT REGARDING FEDERALLY SPONSORED RESEARCH OR DEVELOPMENT

This invention was made with government support under Grant No. 5R44 CA101479-03 awarded by NIH. The government has certain rights in the invention.

BACKGROUND OF THE INVENTION

The invention is related to the field of analyzing data which includes multiple peak data and, in particular, pertains to an automatic method for analyzing data which includes multiple peak data resulting in high resolution estimates.

Work in chromatography, spectroscopy, engineering, pharmacology, and other fields frequently requires analysis of data sets exhibiting multiple peaks. Analysis of multi-peak data is particularly difficult when peaks overlap, or when data are noisy. Peak finding algorithms of many types are used to identify and interpret peaks and peak positions.

Present state-of-the-art peak finders are either based upon 1] simple matched filters, or wavelets, or searches for local maxima in the time series (resulting in less-than-optimal resolution), 2] parameter fitting to peaks using optimization methods, sometimes on the entire time series (such methods are slow), or 3] direct methods which involve significant operator interaction (i.e. by placing cursors over peaks on a computer screen, estimating baselines by eye, etc.). All of these methods have disadvantages. The method described herein runs essentially like a filter, results in much higher resolution estimates of peak positions and amplitudes than the existing state-of-the-art, and is almost completely automatic.

SUMMARY OF THE INVENTION

The invention described herein details a protocol to improve analysis and peak identification in spectroscopic data. Bayesian methods are used to automatically identify peaks in data sets. After identifying peak shapes, the method tests the hypothesis that a given number of peaks is found within any given data window. If a peak is identified within a given window, then the likelihood function is maximized in order to estimate peak position and amplitude.

This process yields a spectrum with high resolution and minimal artifacts. Furthermore, the process is not overly computational intensive, with low delay times required. A method that simply maximizes the likelihood function is likely to generate artifacts, while a method that only tests the hypothesis that a peak is present, without the subsequent maximization of the likelihood function, will yield a spectrum with decreased resolution.

The peak identification method described herein is potentially useful in any data set wherein peaks of interest are distinguished. The method described herein is useful for identifying peaks in data sets obtained from spectroscopy, including but not limited to various forms of absorption and emission spectroscopy, including absorption spectroscopy, UV/VIS spectroscopy, IR spectroscopy, X-ray spectroscopy, X-ray crystallography, Nuclear Magnetic Resonance spectroscopy (NMR), and raman spectroscopy. In particular, the methods described herein are useful for applications in mass spectroscopy, including TOF-SIMS and SELDI-MS. For example, the methods described herein are useful for analyzing TOF-SIMS mass spectroscopic data related to proteomics. The methods described herein are not limited to spectroscopic applications; for example, the methods are particularly useful when used for imaging applications.

DETAILED DESCRIPTION OF THE INVENTION

The following symbols are accorded the following meanings:

N total number of data points in the window
$s_j = s(t_j)$ j=1 . . . N observed signal prior to any processing
$x_j = x(t_j)$ ideal wavelet shape
$\eta_j = \eta(t_j)$ noise
$\sigma_\eta^2 = \langle \eta \eta^T \rangle$ noise co-variance Herein we describe the use of Bayesian methods to automatically identify peaks in data sets. We start with a brief overview of the logic. The first step is to compare the hypotheses that there are a given number of peaks (i.e., 0, 1, 2, . . . n) in the observation window. If a peak is present, we then estimate its position and amplitude via parameter fitting.

After this summary of the logic, we develop algebras for two simple cases where Gaussian or Poisson noise is involved. Both of these cases are simple enough that all results can be arrived at in closed form. We first present how to derive a matched filter for a known peak shape that is embedded in additive white (Gaussian) noise of unknown amplitude. We then show the similar procedure can be applied to Poisson noised data. Some preliminary results on SELDI-MS (Surface Enhanced Laser Desorption Ionization Mass Spectrometer) and TOF-SIMS (Time of Flight Secondary Ionization Mass Spectrometer) data are shown. It is easy to add color (finite time correlations) to the noise. Once these simple situations are understood, extending to other types of noise, such combinations of Poisson, Gaussian, and coherent 'noise' processes, is logically straightforward, though algebraically more involved. All of the methods described herein require knowledge of the 'target' peak shape.

Figure 1:
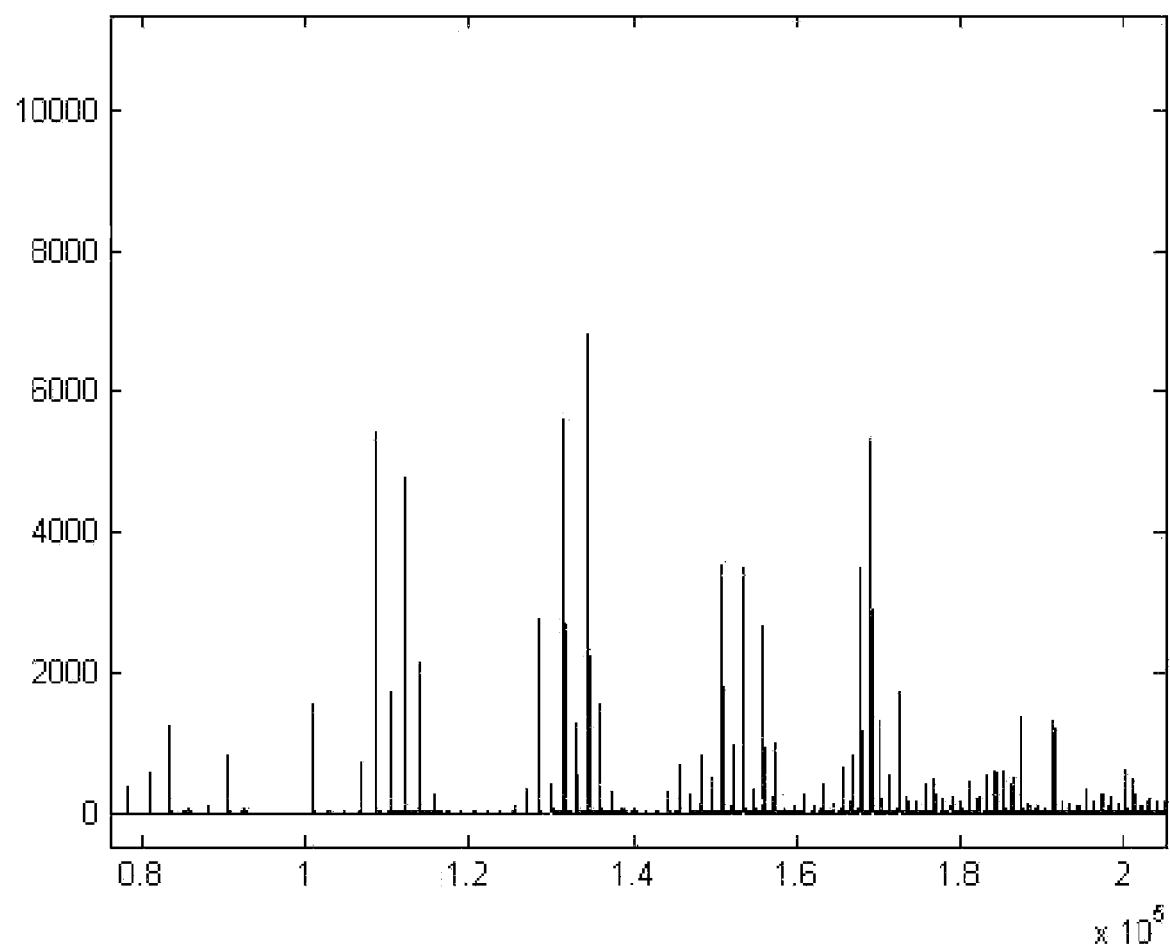
FIG. 1 shows a sample spectrum, in which the number of ions is plotted versus the time required for the ions to reach the detector.

FIG. 1 shows a sample mass spectrum, in which the number of ions is was plotted versus the time that ions take to fly to detector. Ideally, ions of a specific m/z would exhibit the same time of flight, resulting in sharp peak line shape like a delta function. However, in reality, they enter the drift region with velocity and time distributions of finite width, which results in a finite peak width for ions of a specific m/z.

1.1 Description of the Underlying Assumptions

1.1.1 The Relationship Between Peak Signal and Probability Density

In counting experiments, ideally only one ion of a given mass arrives, or at most a few ions of the same mass arrive, at the detector during a given temporal sampling interval and are counted individually. The measurement is repeated many times under nominally identical conditions and one gradually builds up a portrait of the probability distribution of arrival times for each ion mass. This means that the final time series s(t) that is to be analyzed after all the data has been gathered, is proportional to the conditional probability distribution $$s(t_k)\Delta t \propto p(t_k|f_0(v^*(m),t^*))\Delta t, \qquad (1)$$

wherein s(t)Δt is the signal amplitude at time $t_k$, Δt is the sampling interval, and $p(t_k|f_0(v^*(m),t^*))$ is the probability that an ion of mass m will strike the detector between $t_k$ and $t_k+\Delta t$ given that it entered the drift region at time t* with a velocity close to v*(m). If only one ion species is present, the initial velocity distribution, $f_0(v^*(m),t^*)$ is just a sharply peaked function of v of the form $$f_0(v_*(m), t_*) = g\left(\frac{v - v_*(m)}{\sigma(m)}\right), \int ds g(s) = 1. \qquad (2)$$

If a variety of different ions is present, $f_0$ will be a superposition of terms like (2), properly normalized so that $f_0$ will have unit total area. This assumes that the shape of the velocity spread is universal, up to translation and rescaling. We will assume v*(m) and σ(m) to be weak functions of the mass, and to scale like $1/\sqrt{m}$. Fixing their functional form is part of the calibration process. In practice, the velocity distributions for each peak will contain information about the dynamics of the ion formation process, which depend upon the ion species. However, if we assume that the ion optics are designed so that it will only pass a narrow range of most possible velocities for any given mass, then maximizing the entropy of the probability distribution $f_0$ for a single peak, given v* and σ, leads to the choice of a Gaussian for g:

$$g\left(\frac{v - v_*}{\sigma}\right) = \frac{1}{\sqrt{2\pi}\,\sigma} \exp\left(-\frac{(v - v_*)^2}{2\sigma^2}\right) \qquad (3)$$

The choice of the maximum-entropy distribution is founded upon the principle that it maximizes the number of possible outcomes of repeated observations that are consistent with this assignment of the probability. Hence, it is the least biasing assignment of the probability that is consistent with our limited knowledge of the initial distribution. Transforming from the initial velocity distribution g to the temporal peak shape requires solution of a simple Fokker-Planck equation, and is described later.

1.1.2 The Assumption of Independence

The observed peaks for a portion of a spectrum show in FIG. 1 have finite width in time. One of the causes is the finite width of the velocity distribution upon entering free flight. However, it is important to realize that ions that arrive between time $t_k$ and $t_k+\Delta t$ are independent of those that arrive at any other time. This is because, as stated in the previous section, each event/measurement only results in one or at most a few ions of a given m/z. The resulting spectrum is an accumulation of many measurements under the same experiment condition. Therefore, the joint probability of arrival of two ions at two different times satisfies $$p(t_k,t_j|f_0) = p(t_k|f_0)p(t_j|f_0), j \neq k. \qquad (4)$$

even for counts associated with the same mass peak. Any correlations in the signal are assumed to be due to the electronics. If such correlations are present (as they are in MALDI and SELDI spectra) then this must be included in the analysis as part of the model used, as will be discussed later. The assumption of independence, however, underlies the entire analysis that we pursue below in the first few examples.

Because the measurement is repeated many times under 'identical' conditions, producing the same $f_0$ at each repetition (with the 'clock time' t reset to zero at the start of each measurement), if a total number of $\bar{n}$ ions are counted over the entire course of the measurement, then the total number of counts between $t_k$ and $t_k+\Delta t$ is very nearly $$n_k \approx p(t_k|f_0)\bar{n} \qquad (5)$$

1.2 Model Comparisons (i.e. Counting Peaks in the Window, Comparing Noise Models)

We now consider the peak of a particular of mass m. We introduce a window that includes only N points in the time series. The width of the window is chosen to be a slowly varying function of the mass so that it typically will run only from the half-maxima to the left and right of a 'typical' peak of mass m. The change in window width is due to the nature of time-of-flight apparatus where heavier ions will arrive later in time and show up with wider peak shape. This is a rough-and-ready compromise between the desire to include as much data as possible in the window to improve the sampling statistics, and the realization that peaks will overlap and that our peak shape model is probably not very good out on the tails of the peak.

Focus attention now on a particular window position. We label the window location, $t_0$ in such a way that if a mass peak appeared in the window with zero width then the likelihood function (defined momentarily) will be maximized at $t_0$. Because of the mass-dependent asymmetry in peak line shape, $t_0$ is certainly not at the leading or trailing edge of the window. It is also not located at the center of the window, nor at the maximum of the 'target' temporal peak shape, but lies somewhere between these two points at a position which is weakly dependent upon m. In this way, we correct for systematic errors in the estimation of the peak shape due to its mass-dependent asymmetry.

We define the target shape of the temporal peak to be $x(t-t_0)$ which is then sampled at discrete time intervals, giving the N-component vector $$x=(x_1, \ldots, x_N) \equiv (x(t_1-t_0), \ldots, x(t_N-t_0)) \qquad (6)$$

This 'slides' with the window and for convenience is normalized to have unit area:

$$\sum_{k=1}^{N} x_k = 1 \qquad (7)$$

This will only introduce a constant correction for the peak amplitude computed later. We now assume that the observed signal s(t) within the window is given by $$s_k = \alpha x_k + \xi_k, \; k=1,2,\ldots N \quad (8)$$

where a is an unknown amplitude and $\xi=(\xi_1,\xi_2,\ldots \xi_N)$ is a random process of some appropriate type. If more than one peak is present in the window, this complicates the analysis because more parameters must be fit, but the logic is similar to what we describe below. For counting experiments, we do not observe the signal s(t) directly, but instead count how many times it crosses some detection threshold in a time interval $\Delta t$. This is because a single ion striking a microchannel plate, or a channeltron, will initiate a cascade of electron emission that amplifies the original micro-pulse into one that is macroscopically detectable. The noise process will be Poisson with some appropriately chosen rate, while for analog experiments it is probably a combination of Poisson and Gaussian processes. For the moment, we leave the choice of noise model aside and simply assert that choosing a noise model is part of the model selection process, and choosing between them is part of the hypothesis testing we now describe.

Under the assumption that the ion counts at different times are independent, the probability of observing the particular count sequence $n=(n_1,n_2,K\, n_N)$ is simply $$p(n|a, \lambda, t_0, M) = p(\{n_1, n_2, K\, n_N\}|a, \lambda, t_0, M) \quad (9)$$
$$= \prod_{k=1}^{N} p(n_k|a, \lambda, t_0, M)$$

By the notation $\lambda$ we indicate a parameter that characterizes the noise process (e.g. the variance $\sigma$ for a Gaussian process or the 'dark' rate $r_0$ for a Poisson process). By M we mean to emphasize a particular choice of model class, including a peak shape x(t) and a noise model. The probability (9) is the likelihood function of observing the data in the window labeled $t_0$, given the model class M and the parameters.

We first want to decide whether there is a peak in the window or not. This is a comparison between two hypotheses:

$H_0$=There is no peak in the widow $t_0$. The data are noise of the assumed type. Let's call the associated pure-noise model $M_0$.

$H_1$=There is a single peak in the widow $t_0$ with the shape x. Deviations from this shape in the data are due to noise of the assumed type. Let's call the associated peak-plus-noise model $M_1$.

We wish to compute the probability of which each of these hypotheses was true, given the data, and then take the ratio $$\frac{p(H_1|n)}{p(H_0|n)} = \frac{p(M_1|n, t_0)}{p(M_0|n, t_0)} \quad (10)$$

If this ratio is large compared to one, we can be confident that there is probably a peak in the window, while if it is approximately one we interpret that as saying there is only weak evidence of a peak in the window (because $\alpha=0$ is a possible estimate of the peak amplitude, which we interpret as 'no peak'). Therefore, one may set an appreciable threshold for peak detection. In order to derive (10) from (9), we first invoke Bayes' theorem which states:

$$p(A|B)p(B) = p(B|A)p(A) \Rightarrow p(A|B) = \frac{p(B|A)p(A)}{p(B)} \quad (11)$$

Therefore, identifying A as the model class $M_k$, and B as the observed data in the time window $t_0$:

$$p(M_k|n, t_0) = \frac{p(n|M_k, t_0)p(M_k|t_0)}{p(n|t_0)} \quad (12)$$

Since we are given that we observed the data n in the window $t_0$, the denominator is unity. If we have no reason to prefer one model class over another, we should assign them all equal prior probabilities. For example, if we are comparing two types of models (a single peak vs. no peak), then $p(M_0|t_0)=p(M_1|t_0)=\frac{1}{2}$. Therefore, we have the simple result that $$p(M_k|n, t_0) = \frac{1}{2}p(n|M_k, t_0) \quad (13)$$

Hence, we need to calculate the likelihood that we observed the data given the model class, $p(n|M_k,t_0)$, a quantity called the evidence. We get this by integrating the likelihood function (9) over the model parameters using an appropriate prior for the parameters:

$$p(n|M_k,t_0)=\int da d\lambda p(n|\alpha,\lambda,M_k,t_0)p(\alpha,\lambda|M_k,t_0) \quad (14)$$

where $p(\alpha,\lambda|M_k,t_0)$ is prior distributions of parameters $(\alpha,\lambda)$. For each model class, there will be a prior probability distribution for the parameters. For example, when no peak is present we choose as the prior:

$$p(a, \lambda|t_0, M_0) = \frac{1}{2}\delta(a)p(\lambda|t_0, M_0) \quad (15)$$

where the $\frac{1}{2}$ factor appears because the $\delta$-function will be integrated only over the positive values of $\alpha$. If we know nothing about the values of $\lambda$, then we choose a uniform prior, or some other prior that is very broad in $\lambda$-space on the grounds that when we integrate against (9) only the neighborhood of the maximum likelihood value of $\lambda$ will contribute.

The likelihood of the data given the model (14) will be a bit less mysterious when we calculate for specific models momentarily. Before doing so, we summarize that to compare the hypotheses that there is, or is not, a peak in the window, we need to compute the ratio (10), which requires computation of (14) for each model. Setting the threshold for the level of evidence we require for 'peak detection' is a separate issue. Given that we have detected that a peak lies within a certain region of the time axis, we then fix the position and amplitude of the peak by maximizing the likelihood over the parameters $(\alpha,\lambda,t_0)$, as discussed in next section. Notice, however, that maximizing over $t_0$ has a different logical character than the other parameters, because we are comparing different data sets as we slide the window across the peak. The justification is based upon the physical reasonableness of the approach: the width of the window is large compared to the uncertainty in the position of the peak, hence near the maximum of the likelihood, most of the data being compared comes from overlapping windows.

1.3 Parameter Fitting

As the window sliding across the spectrum one point at a time, the ratio (10) is calculated for each window position. We can then justify in which region in the spectrum we are confident that there is a peak. We then look into particular regions of interest, fit parameters $(\alpha, \lambda)$ by maximizing equation (9), i.e. solve the following equations, for each window $t_0$:

$$\frac{\partial L}{\partial a} = 0 \qquad (16)$$
$$\frac{\partial L}{\partial \lambda} = 0$$

where $L(t_0)$, the natural logarithm of likelihood function (9):

$$L(t_0) = \ln(p(n|\alpha,\lambda,M_k,t_0)) \qquad (17)$$

Solving equations (16) gives the maximum likelihood estimations of parameters $(\alpha^*, \lambda^*)$. If the data is very informative, then the likelihood would sharply peak around the point $(\alpha^*, \lambda^*)$ in the parameter space. It is natural to Taylor expand (17) around $(\alpha^*, \lambda^*)$:

$$L \approx L(a^*, \lambda^*) + \frac{1}{2}\begin{bmatrix} \frac{\partial^2 L}{\partial a^2}\bigg|_{a^*,\lambda^*}(a-a^*)^2 + \frac{\partial^2 L}{\partial a \partial \lambda}\bigg|_{a^*,\lambda^*} \\ (a-a^*)(\lambda-\lambda^*) + \frac{\partial^2 L}{\partial \lambda^2}\bigg|_{a^*,\lambda^*}(\lambda-\lambda^*)^2 \end{bmatrix} \qquad (18)$$

$$= L(a^*, \lambda^*) + \frac{1}{2}(X - X^*)' \nabla \nabla L(a^*, \lambda^*)(X - X^*)$$

where $X = \begin{bmatrix} a \\ \lambda \end{bmatrix}$, and $$\nabla \nabla L \begin{bmatrix} \frac{\partial^2 L}{\partial a^2} & \frac{\partial^2 L}{\partial a \partial \lambda} \\ \frac{\partial^2 L}{\partial a \partial \lambda} & \frac{\partial^2 L}{\partial \lambda^2} \end{bmatrix} \qquad (19)$$

is the Hessian matrix. It follows from (18) that the likelihood function (9) is approximately:

$$p(n|a, \lambda, M, t_0) = \exp[L(t_0)] \qquad (20)$$
$$\approx \exp\left(L(a^*, \lambda^*) + \frac{1}{2}(X - X^*)' \nabla \nabla L(a^*, \lambda^*)(X - X^*)\right)$$
$$= e^{L(a^*,\lambda^*)} e^{\frac{1}{2}(X-X^*)' \nabla \nabla L(a^*,\lambda^*)(X-X^*)}$$

This implies that the likelihood function (9) looks like a multivariate normal distribution in parameter space, with uncertainties:

$$\sigma_a = \left(-\frac{\partial^2 L}{\partial a^2}\bigg|_{a^*,\lambda^*}\right)^{-1/2} \qquad (21)$$
$$\sigma_\lambda = \left(-\frac{\partial^2 L}{\partial \lambda^2}\bigg|_{a^*,\lambda^*}\right)^{-1/2}$$

Moreover, when computing the evidence, i.e. marginalizing the likelihood function (9) over the prior $p(\alpha,\lambda|M_k,t_0)$, as seen in equation (14), if the prior is independent of $(\alpha, \lambda)$, for example, $\alpha$ and $\lambda$ are uniformly distributed in some region $(\alpha_{min}, \alpha_{max})$ and $(\lambda_{min}, \lambda_{max})$, substituting equation (20) into equation (14) results in the following:

$$p(n|M_k, t_0) = \int da d\lambda p(n|a, \lambda, M_k, t_0) p(a, \lambda|M_k, t_0) \qquad (22)$$
$$= \int_{a_{min}}^{a_{max}} \int_{\lambda_{min}}^{\lambda_{max}} da d\lambda e^{L(a^*,\lambda^*)}$$
$$e^{\frac{1}{2}(X-X^*)' \nabla \nabla L(a^*,\lambda^*)(X-X^*)}$$
$$\frac{1}{a_{max} - a_{min}} \frac{1}{\lambda_{max} - \lambda_{min}}$$
$$= \frac{1}{a_{max} - a_{min}} \frac{1}{\lambda_{max} - \lambda_{min}} e^{L(a^*,\lambda^*)} \frac{(2\pi)^{m/2}}{\sqrt{\det[\nabla \nabla L(a^*, \lambda^*)]}}$$

where m in equation (22) is the dimension of parameter space. In the last step of the integration, the lower and upper boundaries of integration are extended to infinity. This is doable on the basis that $(\alpha_{min}, \alpha_{max})$ and $(\lambda_{min}, \lambda_{max})$ are large enough such that contributions from outside these regions are negligible. Note $\det[\nabla \nabla L(\alpha^*,\lambda^*)]$ is the determinant of the Hessian matrix evaluated at $(\alpha^*,\lambda^*)$, and $1/\det[\nabla \nabla L(\alpha^*, \lambda^*)]$ is proportional to the volume within $\sigma_\alpha$ and $\sigma_\lambda$ around $(\alpha^*,\lambda^*)$ in parameter space.

2. Finding a Peak in a Time-of-flight Mass Spectrum.

We now consider some specific examples, following the discussion above. The first concerns the detection of a peak in white Gaussian noise. We show that the approach described above leads to what is called the 'matched filter' in the engineering literature. After that, we move on the applications in 'counting' problems, where the noise is due to the discreteness of the underlying process and a Poisson noise model is more appropriate. The later case is of particular interest as it is related to TOF-SIMS (Time of Flight Secondary Ionization Mass Spectrometer). The Gaussian noise case is also important as it may relate to other mass spectrometer, such as SELDI (Surface Enhanced Laser Desorption Ionization). In this section, we do not specify the peak shape for both Gaussian noise case and Poisson noise case, we simply use $x_i$ to denote peak shape in general. In section 3, before we present some preliminary results, we will choose a particular peak shape, motivated by the kinematics of TOF-MS instruments.

Before we go to detailed calculations for Gaussian and Poisson noise cases, let us summarize that, in order to compare model $M_0$ v.s $M_1$, we need to evaluate the ratio (10), in which we need to compute (14) by marginalizing (9) over prior distribution $p(\alpha,\lambda|M_k,t_0)$. Parameters are fitted by maximizing the likelihood function (9), via solving equation (16).

For convenience, from now on, except for $t_0$, when we refer to parameters associated with model $M_0$, a subscript 0 will be used, and a subscript 1 will be used for parameters associated with model $M_1$. For both models, a superscript of star * will be used for best estimations of parameters.

2.1 Some Preliminary Results for Gaussian Noise Models 2.1.1 Model Comparison

We assume the noise process is Gaussian and white:

$$\langle \eta(t_j) \rangle = \mu, \langle \eta(t_j)\eta(t_k) \rangle = \delta_{jk}, \; p_1(\eta(t_k)) = \frac{1}{\sqrt{2\pi}\,\sigma_\eta} \exp\left(-\frac{(\eta(t_k)-\mu)^2}{2\sigma_\eta^2}\right) \quad (23)$$

wherein the subscript on the probability density indicates that this is the PDF for a single time step. We use this single-step PDF to compute the joint probability that we would have observed the N-step noise sequence $\eta(t_k)$, $k=1, 2 \ldots N$.

We want to compare the models having a peak in the window ($M_1$) to those lacking a peak in the window ($M_0$). Therefore, we need to evaluate (14) for both $M_1$ and $M_0$.

We first assume there is no peak present, only noise, and that each time step is independent of the others:

$$p_N(\eta \mid \mu_0, \sigma_{\eta 0}, M_0) = \prod_{j=1}^{N} \frac{1}{\sqrt{2\pi}\,\sigma_{\eta 0}} \exp\left(-\frac{1}{2\sigma_{\eta 0}^2}(\eta(t_j)-\mu_0)^2\right). \quad (24)$$

The notation $\eta$ in the argument of the likelihood function represents an N-dimensional vector of noise values. Collecting terms, we find $$p_N(\eta \mid \mu_0, \sigma_{\eta 0}, M_0) = \frac{1}{(2\pi)^{N/2}\sigma_{\eta 0}^N} \exp\left(-\frac{1}{2\sigma_{\eta 0}^2}\sum_{j=1}^{N}(\eta(t_j)-\mu_0)^2\right) \quad (25)$$

The exponent is a quadratic function of $\mu_0$, therefore we complete the square and write it as $$\sum_{j=1}^{N}(\eta(t_j)-\mu_0)^2 = N(\mu_0-\mu_*)^2 + N\sigma_*^2 \quad (26)$$

where $$\mu_* = \frac{1}{N}\sum_{j=1}^{N}\eta_j, \; \text{and} \; \sigma_*^2 = \frac{1}{N}\sum_{j=1}^{N}(\eta_j-\mu_*)^2 \quad (27)$$

The likelihood function now becomes:

$$p_N(\eta \mid \mu_0, \sigma_{\eta 0}, M_0) = \frac{1}{(2\pi)^{N/2}\sigma_{\eta 0}^N}\exp\left(-\frac{N\sigma_*^2}{2\sigma_{\eta 0}^2}\right)\exp\left(-\frac{N(\mu_0-\mu_*)^2}{2\sigma_{\eta 0}^2}\right) \quad (28)$$

From this form it is clear that the likelihood is maximized if we choose $\mu_0^* = \mu^*$ and $\sigma_{\eta 0}^* = \sigma^*$, with maximum:

$$p_N^*(\eta) \equiv p_N^*(\eta \mid \mu_0^*, \sigma_{\eta 0}^*, M_0) = \frac{1}{(2\pi e \sigma_{\eta 0}^{*2})^{N/2}}. \quad (29)$$

Comparing this value for different window positions can be used to measure the likelihood that the signal in each window is a Gaussian white noise process. Comparing different models using those parameter values in each model that maximizse the likelihood may not the most robust way to proceed. Instead, it may be preferable to marginalize over all possible values of the model parameters (in this case $\mu_0$ and $\sigma_{\eta 0}$) to get the probability for the model that there is no peak in the window ($M_0$) given the signal observed in the window, which is parameter-free. Doing the same marginalization for the case where a peak is assumed in the window, gives a parameter free probability for model $M_1$. These two parameter-free probabilities are directly comparable.

In evaluating equation (14), we now assume that we know nothing about the prior probabilities for the mean and variance of the noise process, aside from the requirement that they be probabilities in the parameters $\mu_0$ and $\sigma_{\eta 0}$. The simplest choice is to assume that they are constant over some range. Marginalizing, we have:

$$p_N(\eta \mid M_0) = \int_0^\infty \frac{d\sigma_{\eta 0}}{\sigma_{\eta 0 \max}}\int_{-\infty}^{\infty}\frac{d\mu_0}{\mu_{0 \max}} p_N(\eta \mid \mu_0, \sigma_{\eta 0}, M_0) \quad (30)$$

Performing the integral over the parameter $\mu_0$ first we are left with $$p_N(\eta \mid M_0) = \frac{1}{\sigma_{\eta 0 \max}\mu_{0 \max}}\frac{1}{(2\pi)^{(N-1)/2}\sqrt{N}}\int_0^\infty \frac{d\sigma_{\eta 0}}{\sigma_{\eta 0}^{N-1}}\exp\left(-\frac{N\sigma_{\eta 0}^{*2}}{2\sigma_{\eta 0}^2}\right) \quad (31)$$

Changing variables to $$t = \frac{N\sigma_{\eta 0}^{*2}}{2\sigma_{\eta 0}^2} \quad (32)$$

we find $$p_N(\eta \mid M_0) = \frac{1}{2\sqrt{2}\,\pi^{(N-1)/2}}\frac{\Gamma\left(\frac{N}{2}-1\right)}{N^{\frac{N-1}{2}}\sigma_{\eta 0}^{*N-2}}\frac{1}{\sigma_{\eta 0 \max}\mu_{0 \max}} \quad (33)$$

Using Stirling's asymptotic series for the $\Gamma$-function ($\Gamma(x+1) \approx \sqrt{2\pi x}\, x^x e^{-x}(1+\ldots)$)

$$\Gamma\left(\frac{N}{2}-1\right) \approx e^{-\frac{N}{2}+1}\left(\frac{N}{2}-1\right)^{\frac{N}{2}-1-\frac{1}{2}}\sqrt{2\pi} \quad (34)$$

-continued $$\approx e^{-\frac{N}{2}+1}\left(\frac{N}{2}\right)^{\frac{N-3}{2}}\sqrt{2\pi}$$

we find:

$$p_N(\eta \mid M_0) = \frac{1}{(2\pi e \sigma_{\eta 0}^{*2})^{N/2}} \frac{\pi\sqrt{2}\,\sigma_{\eta 0}^{*2}}{N} = p_N^* \frac{\pi\sqrt{2}\,\sigma_{\eta 0}^{*2}}{N} \frac{e}{\sigma_{max}\mu_{max}} \quad (35)$$

Notice that this still depends upon the window position. This result could have been anticipated by the following argument: the integration of the likelihood over $\mu_0$ and $\sigma_{\eta 0}$ will be dominated by the region of $\mu_0\sigma_{\eta 0}$-space in the immediate neighborhood of the maximum likelihood values $\mu_0^*$ and $\sigma_{\eta 0}^*$. Over most of parameter space the likelihood is vanishingly small (if the data is 'informative'). The volume of space over which the likelihood is not vanishingly small is given by the product of the half-widths of the likelihood function in each direction (which are essentially the uncertainties in the parameter estimates). The uncertainties can be estimated from the second derivative of the ln of the likelihood function, and are of the order of $\Delta\mu_0 \square \sigma_{\eta 0}^*/\sqrt{N}$ and $\Delta\sigma_{\eta 0}\square\sigma_{\eta 0}^*/\sqrt{2N}$. Therefore, we have the appealing result that (35) is simply $$p_N(\eta \mid M_0) = 2\pi p_N^*\left(\frac{\Delta\mu_0}{\mu_{0_{max}}}\right)\left(\frac{\Delta\sigma_{\eta 0}}{\sigma_{\eta 0_{max}}}\right)e \quad (36)$$

The results (35) and (29) depend only upon the noise model and are independent of the rest of the model (e.g. peak shapes and positions, if there are any). Equation (33), (35) and (36) are different expressions for evidence.

The computation for $p_N(\eta|M_0)$ is complete. However, we want to point out that there is a way that arrives at (35) and (36) while avoiding above tedious integrals. That is to utilize (22) and (29). The Hessian matrix, as defined in (19), can be easily calculated in case:

$$\nabla\nabla L(\mu_0^*, \sigma_{\eta 0}^*) = \begin{bmatrix} \frac{N}{\sigma_{\eta 0}^{*2}} & 0 \\ 0 & \frac{2N}{\sigma_{\eta 0}^{*2}} \end{bmatrix} \quad (37)$$

Substitute (29) and (37) into (22):

$$p_N'(\eta \mid M_0) \approx \frac{1}{\mu_{0_{max}}}\frac{1}{\sigma_{\eta 0_{max}}}\frac{2\pi\sigma_{\eta 0}^{*2}}{\sqrt{2}\,N}\frac{1}{(2\pi)^{N/2}\sigma_{\eta 0}^{*N}}e^{-N/2} \quad (38)$$

$$= \frac{1}{\mu_{0_{max}}}\frac{1}{\sigma_{\eta 0_{max}}}\frac{\sigma_{\eta 0}^*}{\sqrt{N}}\frac{\sigma_{\eta 0}^*}{\sqrt{2N}}2\pi\frac{1}{(2\pi)^{N/2}\sigma_{\eta 0}^{*N}}e^{-N/2}$$

$$= \frac{1}{\mu_{0_{max}}}\frac{1}{\sigma_{\eta 0_{max}}}\frac{\sigma_{\eta 0}^*}{\sqrt{N}}\frac{\sigma_{\eta 0}^*}{\sqrt{2N}}2\pi p_N^*(\eta \mid \mu_0^*, \sigma_{\eta 0}^*, M_0)$$

$$= \frac{\Delta\mu_0}{\mu_{0_{max}}}\frac{\Delta\sigma_{\eta 0}}{\sigma_{\eta 0_{max}}}2\pi p_N^*(\eta \mid \mu_0^*, \sigma_{\eta 0}^*, M_0)$$

Comparing (38) with (36), they differ by a factor e which comes from Stirling series expansion of $$\Gamma\left(\frac{N}{2}-1\right)$$

in (34).

We now consider there is a peak in the window. Suppose the peak has a line shape described by $x_i$, which peaks near the center of the window. The observed data within the window may be written as:

$$s(t_j) = \alpha_1 x(t_j - t_0) + \eta(t_j)\ j=1\ldots N \quad (39)$$

where the amplitude ($\alpha_1$) and arrival time ($t_0$) of the wavelet, as well as the noise amplitude $\sigma_{\eta 1}$ and mean $\mu_1$, are assumed to be unknown. The marginalization in this case looks like:

$$p(\eta \mid M_1) = \int\int\int da_1 d\mu_1 d\sigma_{\eta 1} p_N(\eta \mid a_1, \mu_1, \sigma_{\eta 1}, t_0, M_1) \quad (40)$$

$$\frac{1}{a_{1_{max}}}\frac{1}{\mu_{1_{max}}}\frac{1}{\sigma_{\eta 1_{max}}}$$

where:

$$p_N(\eta \mid a_1, \mu_1, \sigma_{\eta 1}, t_0, M_1) = \frac{1}{\left(\sqrt{2\pi}\,\sigma_{\eta 1}\right)^N}\exp \quad (41)$$

$$\left(-\frac{1}{2\sigma_{\eta 1}^2}\sum_{i=1}^N (s_i - a_1 x_i - u_1)^2\right)$$

is the realization of likelihood function (9). As in the case of no peak, complete the square, let:

$$u_* = \frac{1}{N}\sum(s_i - a_1 x_i)$$

$$\sigma_{\eta^*}^2 = \frac{1}{N}\sum(s_i - a_1 x_i - u_*)^2$$

one may get:

$$p(\eta \mid M_1) = \int\int da_1 d\mu_1 d\sigma_{\eta 1}\frac{1}{\left(\sqrt{2\pi}\,\sigma_{\eta 1}\right)^N} \quad (42)$$

$$e^{-\frac{1}{2\sigma_{\eta 1}^2}N(\mu_1 - \mu_*)^2}\,e^{-\frac{1}{2\sigma_{\eta 1}^2}N\sigma_{\eta^*}^2}$$

$$\frac{1}{a_{1_{max}}}\frac{1}{\mu_{1_{max}}}\frac{1}{\sigma_{\eta 1_{max}}}$$

$$= \frac{1}{\left(\sqrt{2\pi}\right)^{N-1}\sqrt{N}}\int da_1 d\sigma_{\eta 1}\frac{1}{\sigma_{\eta 1}^{N-1}}e^{-\frac{1}{2\sigma_{\eta 1}^2}N\sigma_{\eta^*}^2}$$

$$\frac{1}{a_{1_{max}}}\frac{1}{\mu_{1_{max}}}\frac{1}{\sigma_{\eta 1_{max}}}$$

$$= \int da_1\frac{1}{2\sqrt{2}\,(N\pi)^{\frac{N-1}{2}}\sigma_{\eta^*}^{N-2}}\Gamma\left(\frac{N}{2}-1\right)$$

-continued $$\frac{1}{a_{1_{max}}} \frac{1}{\sigma_{\eta 1_{max}}} \frac{1}{\mu_{1_{max}}}$$

Note, if we let $(\alpha_1^*, \mu_1^*, \sigma_{\eta 1}^*)$ be the point where the likelihood is maximized, the derivation of $(\alpha_1^*, \mu_1^*, \sigma_{\eta 1}^*)$ will be given momentarily, then $$\sigma_{\eta^*}^2 = \frac{1}{N} \sum (s_i - a_1 x_i - u_*)^2 \quad (43)$$

$$= \frac{1}{N} \sum (s_i - a_1^* x_i - u_1^* - (a_1 - a_1^*) x_i - (u_* - u_1^*))^2$$

$$= \sigma_{\eta 1}^* + \sigma_x^2 \left[ a_1 - a_1^* - \frac{\sum (s_i - a_1^* x_i - u_1^*)(x_i - \bar{x})}{\sigma_x^2 N} \right]^2 -$$

$$\frac{\left[ \sum (s_i - a_1^* x_i - u_1^*)(x_i - \bar{x}) \right]^2}{\sigma_x^2 N^2}$$

$$= A(a - a_1')^2 + B$$

where $$\bar{x} = \frac{\sum x_i}{N} \quad (44)$$

$$\sigma_x^2 = \frac{1}{N} \sum (x_i - \bar{x})^2$$

$$A = \sigma_x^2$$

$$B = \sigma_{\eta 1}^{*2} - \frac{\left[ \sum (s_i - a_1^* x_i - u_1^*)(x_i - \bar{x}) \right]^2}{\sigma_x^2 N^2}$$

$$a_1' = a_1^* + \frac{\sum (s_i - a_1^* x_i - u_1^*)(x_i - \bar{x})}{\sigma_x^2 N}$$

then marginalization may be written as:

$$p(\eta | M_1) = \int da \frac{1}{2\sqrt{2} (N\pi)^{\frac{N-1}{2}} [A(a-a_1')^2 + B]^{\frac{N-2}{2}}} \quad (45)$$

$$\Gamma\left(\frac{N}{2} - 1\right) \frac{1}{a_{max}} \frac{1}{\sigma_{\eta max}} \frac{1}{\mu_{max}}$$

Changing variable $t = (\alpha_1 - \alpha_1')^2$ gives:

$$p(\eta | M_1) = \frac{1}{4\sqrt{2}\pi^{\frac{N}{2}-1} N^{\frac{N-1}{2}}} \frac{B^{-\frac{N}{2}+\frac{3}{2}}}{\sqrt{A}} \Gamma\left(\frac{N}{2} - \frac{3}{2}\right) \quad (46)$$

Now, having $p(\eta|M_0)$ and $p(\eta|M_1)$ computed, one may substitute them into (10) to see which model is more preferable.

Up to this point, the model comparison is complete, as we derived in equations (33) and (46), and equation (10) can be used to compare two hypotheses. Yet, as in parallel with what we did in the $M_0$ case, we can also arrive at an equation similar to equation (46) by computing the Hessian matrix, but this is going to need $(\alpha_1^*, \mu_1^*, \sigma_{\eta 1}^*)$, the best estimation of $(\alpha_1, \mu_1, \sigma_{\eta 1})$.

2.1.2 Parameter Fitting for Gaussian Noise

Once it is determined which model is more appealing, parameters may be fitted via maximizing appropriate likelihood.

For the case where there is no peak in the window, the likelihood (9) is simply:

$$p_N(\eta | \mu_0, \sigma_{\eta 0}, M_0) = \frac{1}{(2\pi)^{N/2} \sigma_{\eta 0}^N} \exp \quad (47)$$

$$\left( -\frac{1}{2\sigma_{\eta 0}^2} \sum_{j=1}^{N} (\eta(t_j) - \mu_0)^2 \right)$$

where $$\eta(t_j) = s(t_j) \quad (48)$$

as only noise is assumed in presence. As it is pointed out in previous section, (47) is maximized at $$\mu_0^* = \frac{1}{N} \sum s_i \quad (49)$$

$$\sigma_{\eta 0}^* = \frac{1}{N} \sum (s_i - \mu_0)^2$$

The uncertainties are, as one can see from the Hessian matrix (37):

$$\Delta \mu_0 = \frac{\sigma_{\eta 0}^*}{\sqrt{N}} \quad (50)$$

$$\Delta \sigma_{\eta 0} = \frac{\sigma_{\eta 0}^*}{\sqrt{2N}}$$

If it is preferred that there is a peak in the window, then the likelihood function (9) looks like:

$$p_N(\eta | a_1, \mu_1, \sigma_{\eta 1}, M_1) = \frac{1}{\left(\sqrt{2\pi} \sigma_{\eta 1}\right)^N} \exp\left( -\frac{1}{2\sigma_{\eta 1}^2} \sum_{i=1}^{N} \eta_i^2 \right) \quad (51)$$

$$= \frac{1}{\left(\sqrt{2\pi} \sigma_{\eta 1}\right)^N} \exp$$

$$\left( -\frac{1}{2\sigma_{\eta 1}^2} \sum_{i=1}^{N} (s_i - a_1 x_i - u_1)^2 \right)$$

the natural logarithm of the likelihood is:

$$L = \log[p_N(\eta | a_1, \mu_1, \sigma_{\eta 1}, M_1)] \quad (52)$$

$$= -\frac{N}{2} \log(2\pi) - N \log(\sigma_{\eta 1}) - \frac{1}{2\sigma_{\eta 1}^2} \sum_{i=1}^{N} (s_i - a_1 x_i - \mu_1)^2$$

In order to maximize this value, let:

$$\frac{\partial L}{\partial a_1} = -\frac{1}{\sigma_{\eta 1}^2}\sum_{i=1}^{N}(s_i - a_1 x_i - \mu_1)(-x_i) = 0 \quad (53)$$

$$\frac{\partial L}{\partial \mu_1} = -\frac{1}{\sigma_{\eta 1}^2}\sum_{i=1}^{N}(s_i - a_1 x_i - \mu_1)(-1) = 0$$

$$\frac{\partial L}{\partial \sigma_{\eta 1}} = -\frac{N}{\sigma_{\eta 1}} + \frac{1}{\sigma_{\eta 1}^3}\sum_{i=1}^{N}(s_i - a_1 x_i - \mu_1)^2 = 0$$

Solving these equations gives:

$$a_1^* = \frac{\overline{(sx)} - \overline{s}\,\overline{x}}{\overline{x^2} - \overline{x}^2} \quad (54)$$

$$= \frac{\overline{(s-\overline{s})(x-\overline{x})}}{\overline{(x-\overline{x})^2}}$$

$$= \frac{\overline{(s-\overline{s})(x-\overline{x})}}{\sigma_x^2}$$

$$\mu_1^* = \overline{s} - a_1^* \overline{x}$$

$$\sigma_{\eta 1}^* = \overline{(s_i - \overline{s} - a_1(x_i - \overline{x}))^2} = \sigma_s^2 - a_1^2 \sigma_x^2$$

The log of the likelihood function at $(\alpha_1^*, \mu_1^*, \sigma_{\eta 1}^*)$ is simply:

$$L(a_1^*, \mu_1^*, \sigma_{\eta 1}^*) = -N\log(\sigma_{\eta 1}^*) - \frac{N}{2}\log(2\pi) - \frac{N}{2} \quad (55)$$

The elements in Hessian matrix $\nabla\nabla L(\alpha_1, \mu_1, \sigma_{\eta 1})$ evaluated at $(\alpha_1^*, \mu_1^*, \sigma_{\eta 1}^*)$ are:

$$-\frac{\partial^2 L}{\partial a_1^2}\bigg|_{(a_1^*,\mu_1^*,\sigma_{\eta 1}^*)} = \frac{1}{\sigma_{\eta 1}^{*2}}\sum_{i=1}^{N}x_i^2 = \frac{N(\sigma_x^2 + \overline{x}^2)}{\sigma_{\eta 1}^{*2}} \quad (56)$$

$$-\frac{\partial^2 L}{\partial \mu_1^2}\bigg|_{(a_1^*,\mu_1^*,\sigma_{\eta 1}^*)} = \frac{1}{\sigma_{\eta 1}^{*2}}\sum_{i=1}^{N}(1) = \frac{N}{\sigma_{\eta 1}^{*2}}$$

$$-\frac{\partial^2 L}{\partial \sigma_{\eta 1}^2}\bigg|_{(a_1^*,\mu_1^*,\sigma_{\eta 1}^*)} = -\frac{N}{\sigma_{\eta 1}^{*2}} + \frac{3}{\sigma_{\eta 1}^{*4}}\sum_{i=1}^{N}(s_i - a_1^* x_i - \mu_1^*)^2$$

$$= \frac{2N}{\sigma_{\eta 1}^{*2}}$$

$$-\frac{\partial^2 L}{\partial a_1 \partial \mu_1}\bigg|_{(a_1^*,\mu_1^*,\sigma_{\eta 1}^*)} = \frac{\sum_{i=1}^{N}x_i}{\sigma_{\eta 1}^{*2}}$$

$$-\frac{\partial^2 L}{\partial \mu_1 \partial \sigma_{\eta 1}}\bigg|_{(a_1^*,\mu_1^*,\sigma_{\eta 1}^*)} = \frac{2}{\sigma_{\eta 1}^{*3}}\sum_{i=1}^{N}(s_i - a_1^* x_i - \mu_1^*) = 0$$

$$-\frac{\partial^2 L}{\partial a_1 \partial \sigma_{\eta 1}}\bigg|_{(a_1^*,\mu_1^*,\sigma_{\eta 1}^*)} = \frac{2}{\sigma_{\eta 1}^{*3}}\sum_{i=1}^{N}(s_i - a_1^* x_i - \mu_1^*)x_i = 0$$

The last $2^{nd}$ term is zero obviously because $\mu_1^* = \overline{s} - \alpha_1^*\overline{x}$. The last term is also zero because it is proportional to the correlation between the residue, which is presumably white noise with zero mean, and the target $x_i$, which is zero. Nevertheless, it can be shown by following:

$$\sum_{i=1}^{N}(s_i - a_1^* x_i - \mu_1^*)x_i = \sum_{i=1}^{N}(s_i - a_1^* x_i - \overline{s} + a_1^* \overline{x})x_i \quad (57)$$

$$= \sum_{i=1}^{N}s_i x_i - a_1^*\sum_{i=1}^{N}x_i^2 -$$

$$\overline{s}\sum_{i=1}^{N}x_i + a_1^*\overline{x}\sum_{i=1}^{N}x_i$$

$$= N(\overline{sx} - a_1^*\overline{x^2} - \overline{s}\,\overline{x} + a_1^*\overline{x}^2)$$

$$= N(\overline{sx} - \overline{s}\,\overline{x} - a_1^*(\overline{x^2} - \overline{x}^2))$$

$$= N(\overline{(s-\overline{s})(x-\overline{x})} - a_1^*\sigma_x^2)$$

$$= 0$$

With all elements of Hessian matrix computed, we can now write out the Hessian matrix $\nabla\nabla L(\alpha_1^*, \mu_1^*, \sigma_{\eta 1}^*)$:

$$\nabla\nabla L(a_1^*, \mu_1^*, \sigma_{\eta 1}^*) = \begin{bmatrix} \dfrac{N(\sigma_x^2 + \overline{x}^2)}{\sigma_{\eta 1}^{*2}} & \dfrac{\sum_{i=1}^{N}x_i}{\sigma_{\eta 1}^{*2}} & 0 \\[2ex] \dfrac{\sum_{i=1}^{N}x_i}{\sigma_{\eta 1}^{*2}} & \dfrac{N}{\sigma_{\eta 1}^{*2}} & 0 \\[2ex] 0 & 0 & \dfrac{2N}{\sigma_{\eta 1}^{*2}} \end{bmatrix} \quad (58)$$

From which, one can get the uncertainties:

$$\Delta a_1 = \frac{\sigma_{\eta 1}^*}{\sqrt{N(\sigma_x^2 + \overline{x}^2)}} \quad (59)$$

$$\Delta \mu_1 = \frac{\sigma_{\eta 1}^*}{\sqrt{N}}$$

$$\Delta \sigma_{\eta 1} = \frac{\sigma_{\eta 1}^*}{\sqrt{2N}},$$

From (22), we have:

$$p'(\eta \mid M_1) \approx \frac{1}{a_{1\max}}\frac{1}{\mu_{1\max}}\frac{1}{\sigma_{\eta 1\max}} \quad (60)$$

$$\frac{(2\pi)^{3/2}}{\sqrt{\det(\nabla\nabla L(a_1^*, \mu_1^*, \sigma_{\eta 1}^*))}}e^{L(a_1^*,\mu_1^*,\sigma_{\eta 1}^*)}$$

in which $$\det[\nabla\nabla L(a_1^*, \mu_1^*, \sigma_{\eta 1}^*)] = \frac{2N^3(\sigma_x^2 + \overline{x}^2)}{\sigma_{\eta 1}^{*6}} - \frac{2N\left(\sum_{i=1}^{N}x_i\right)^2}{\sigma_{\eta 1}^{*6}} \quad (61)$$

-continued $$= \frac{2N^3(\sigma_x^2 + \bar{x}^2) - 2N^3\bar{x}^2}{\sigma_{\eta 1}^{*6}}$$

$$= \frac{2N^3 \sigma_x^2}{\sigma_{\eta 1}^{*6}}$$

and:

$$\frac{1}{\sqrt{\det[\nabla\nabla L(a_1^*, \mu_1^*, \sigma_{\eta 1}^*)]}} = \frac{\sigma_{\eta 1}^*}{\sqrt{N\sigma_x^2}} \frac{\sigma_{\eta 1}^*}{\sqrt{N}} \frac{\sigma_{\eta 1}^*}{\sqrt{2N}} \quad (62)$$

$$\propto \Delta a_1 \Delta \mu_1 \Delta \sigma_{\eta 1}$$

Substitute (62) into (60):

$$p'(\eta | M_1) \approx \frac{1}{a_{1_{\max}}} \frac{1}{\mu_{1_{\max}}} \frac{1}{\sigma_{\eta 1_{\max}}} \quad (63)$$

$$\frac{(2\pi)^{3/2} \sigma_{\eta 1}^{*3}}{(2N^3)^{1/2} \sigma_x} \frac{1}{(2\pi)^{N/2} \sigma_{\eta 1}^{*N}} e^{-N/2}$$

$$= \frac{1}{a_{1_{\max}}} \frac{1}{\mu_{1_{\max}}} \frac{1}{\sigma_{\eta 1_{\max}}} \frac{\sigma_{\eta 1}^*}{\sqrt{N\sigma_x^2}} \frac{\sigma_{\eta 1}^*}{\sqrt{N}} \frac{\sigma_{\eta 1}^*}{\sqrt{2N}}$$

$$(2\pi)^{3/2} \frac{1}{(2\pi)^{N/2} \sigma_{\eta 1}^{*N}} e^{-N/2}$$

$$= \frac{1}{a_{1_{\max}}} \frac{1}{\mu_{1_{\max}}} \frac{1}{\sigma_{\eta 1_{\max}}} \frac{\sigma_{\eta 1}^*}{\sqrt{N\sigma_x^2}} \frac{\sigma_{\eta 1}^*}{\sqrt{N}} \frac{\sigma_{\eta 1}^*}{\sqrt{2N}}$$

$$(2\pi)^{3/2} p^*(\eta | a_1^*, \mu_1^*, \sigma_{\eta 1}^*, M_1)$$

$$\propto \frac{\Delta a_1}{a_{1_{\max}}} \frac{\Delta \mu_1}{\mu_{1_{\max}}} \frac{\Delta \sigma_{\eta 1}}{\sigma_{\eta 1_{\max}}} (2\pi)^{3/2} p^*(\eta | a_1^*, \mu_1^*, \sigma_{\eta 1}^*, M_1)$$

To compare with (46), first, we noticed that the $2^{nd}$ part in B in (46) is actually zero, i.e. $B = \sigma_{\eta 1}^{*2}$, thus:

$$p(\eta | M_1) = \frac{1}{a_{1_{\max}}} \frac{1}{\mu_{1_{\max}}} \frac{1}{\sigma_{\eta 1_{\max}}} \quad (64)$$

$$\frac{1}{4\sqrt{2} \pi^{\frac{N}{2}-1} N^{\frac{N-1}{2}}} \frac{\sigma_{\eta 1}^{*3}}{\sigma_x \sigma_{\eta 1}^{*N}} \Gamma\left(\frac{N}{2} - \frac{3}{2}\right)$$

Use the Stirling series again, $$\Gamma\left(\frac{N}{2} - \frac{3}{2}\right) \approx e^{-\frac{N}{2}+\frac{3}{2}} \left(\frac{N}{2} - \frac{3}{2}\right)^{\frac{N}{2}-\frac{3}{2}-\frac{1}{2}} \sqrt{2\pi} \quad (65)$$

$$\approx e^{-\frac{N}{2}+\frac{3}{2}} \left(\frac{N}{2}\right)^{\frac{N}{2}-2} \sqrt{2\pi}$$

this makes (64) looks like:

$$p'(\eta | M_1) \approx \frac{1}{a_{1_{\max}}} \frac{1}{\mu_{1_{\max}}} \frac{1}{\sigma_{\eta 1_{\max}}} \quad (66)$$

$$\frac{1}{4\sqrt{2} \pi^{\frac{N}{2}-1} N^{\frac{N-1}{2}}} \frac{\sigma_{\eta 1}^{*3}}{\sigma_x \sigma_{\eta 1}^{*N}} e^{-\frac{N}{2}+\frac{3}{2}} \left(\frac{N}{2}\right)^{\frac{N}{2}-2} \sqrt{2\pi}$$

$$= \frac{1}{a_{1_{\max}}} \frac{1}{\mu_{1_{\max}}} \frac{1}{\sigma_{\eta 1_{\max}}} \frac{\sigma_{\eta 1}^*}{\sqrt{N\sigma_x^2}} \frac{\sigma_{\eta 1}^*}{\sqrt{N}} \frac{\sigma_{\eta 1}^*}{\sqrt{2N}}$$

$$(2\pi)^{3/2} \frac{1}{(2\pi)^{N/2} \sigma_{\eta 1}^{*N}} e^{-N/2} \frac{e^{3/2}}{2}$$

$$\propto \frac{\Delta a_1}{a_{1_{\max}}} \frac{\Delta \mu_1}{\mu_{1_{\max}}} \frac{\Delta \sigma_{\eta 1}}{\sigma_{\eta 1_{\max}}} (2\pi)^{3/2} p^*(\eta | a_1^*, \mu_1^*, \sigma_{\eta 1}^*, M_1)$$

$$\frac{e^{3/2}}{2}$$

This is just like (63) except for the factor $$\frac{e^{3/2}}{2},$$

which likely arises from the Stirling series.

However, with both (38) and (63) calculated, (10) can be written quite neatly:

$$\frac{p(H_1 | n)}{p(H_0 | n)} = \frac{p(M_1 | n, t_0)}{p(M_0 | n, t_0)} \quad (67)$$

$$= \frac{p(\eta | M_1, t_0)}{p(\eta | M_0, t_0)}$$

$$\approx \frac{\frac{1}{a_{1_{\max}}} \frac{1}{\mu_{1_{\max}}} \frac{1}{\sigma_{\eta 1_{\max}}} \frac{(2\pi)^{3/2} \sigma_{\eta 1}^{*3}}{(2N^3)^{1/2} \sigma_x} \frac{1}{(2\pi)^{N/2} \sigma_{\eta 1}^{*N}} e^{-N/2}}{\frac{1}{\mu_{0_{\max}}} \frac{1}{\sigma_{\eta 0_{\max}}} \frac{2\pi \sigma_{\eta 0}^{*2}}{\sqrt{2} N} \frac{1}{(2\pi)^{N/2} \sigma_{\eta 0}^{*N}} e^{-N/2}}$$

$$= \frac{1}{a_{1_{\max}}} \frac{\sigma_{\eta 1}^*}{\sqrt{N\sigma_x^2}} \sqrt{2\pi} \left(\frac{\sigma_{\eta 0}^*}{\sigma_{\eta 1}^*}\right)^{N-2}$$

$$\propto \frac{\Delta a_1}{a_{1_{\max}}} \sqrt{2\pi} \left(\frac{\sigma_{\eta 0}^{*2}}{\sigma_{\eta 1}^{*2}}\right)^{\frac{N-2}{2}}$$

It depends on the amplitude of the peak like $(\alpha_1^*)^{N-2}$ when the window is on top of a peak, where $\sigma_{\eta 0}^{*2} = \sigma_s^2 \sim \alpha_1^{*2} \sigma_x^2 + \sigma_{\eta 1}^{*2}$, while $\sigma_{\eta 1}^{*2}$ is the best estimation of noise variance. It is important to note that only three calculations must ever be done as the window moves:

$$\bar{s} = \frac{1}{N} \sum_{i=1}^{N} s_i \quad (68)$$

$$\sigma_s^2 = \frac{1}{N} \sum_{i=1}^{N} (s_i - \bar{s})^2$$

$$\overline{(s - \bar{s})(x - \bar{x})} = \frac{1}{N} \sum_{i=1}^{N} (s_i - \bar{s})(x_i - \bar{x})$$

2.2 Preliminary Results for Finding Peaks in Poisson Noise 2.2.1 Comparing Models The basic logic is similar to the case of white Gaussian noise. The noise is white because the essence of the Poisson process is that we are counting discrete events that are uncorrelated. The probability that we observe n events in the time interval [t,t+Δt] is given by the single step Poisson distribution:

$$p_1(n|r) = \frac{r^n e^{-r}}{n!}. \quad (69)$$

where r is the rate. We note that the expectation value of n is $\langle n \rangle = \Sigma n p(n|r) = r$. The rate will depend upon the local signal strength. If no signal is present (there is only dark current), then the rate will be denoted $r_0$. The signal rides on top of the dark current and it is assumed that the local count rate is directly proportional to the signal:

$$r_i = r(t_i) = r_0 + \alpha x(t_i) \quad (70)$$

We can try to estimate both $r_0$ and a from the same data, or we can estimate $r_0$ from data taken either from a separate time series, or a region of the time series that is far from any peak.

The likelihood function is then:

$$p(n|a, r_0, M) = \prod_{i=1}^{N} \frac{r_i^{n_i} e^{-r_i}}{n_i!} \quad (71)$$

$$= \prod_{i=1}^{N} \frac{(ax_i + r_0)^{n_i} e^{-(ax_i + r_0)}}{n_i!}$$

$$= e^{-Nr_0} e^{-a} \prod_{i=1}^{N} \frac{(ax_i + r_0)^{n_i}}{n_i!}$$

where it is assumed that $x_i$ has unit area:

$$\sum_{i=1}^{N} x_1 = 1.$$

First, let's consider the case where there is no peak in the window, only the dark current due to electronic fluxion. We may use a prior distribution $$p(a, r_0 | M_0) = \frac{\delta(a)}{2r_{\max}} \quad (72)$$

Marginalizing the likelihood function over $(\alpha, r_0)$ gives:

$$p(n|M_0) = \int\int p(n|a, r_0, M_0) p(a, r_0|M_0) da\, dr_0 \quad (73)$$

$$= \int\int e^{-Nr_0} e^{-a} \prod_{i=1}^{N} \frac{(ax_i + r_0)^{n_i}}{n_i!} \frac{\delta(a)}{2r_{\max}} da\, dr_0$$

$$= \frac{1}{2r_{\max} \prod n_i!} \int_0^{r_{\max}} e^{-Nr_0} r_0^{\Sigma_{i=1}^{N} n_i} dr_0$$

Change variable:

$$Nr_0 = t \quad (74)$$

$$dr_0 = \frac{dt}{N}$$

$$r_0^{\Sigma n_i} = \left(\frac{t}{N}\right)^{\Sigma n_i}$$

then $$p(n|M_0) = \frac{1}{2r_{\max} \prod n_i!} \int e^{-t}\left(\frac{t}{N}\right)^{\Sigma_{i=1}^{N} n_i} \frac{dt}{N} \quad (75)$$

$$= \frac{1}{2r_{\max} N^{1+\Sigma_{i=1}^{N} n_i} \prod n_i!} \int e^{-t} t^{\Sigma_{i=1}^{N} n_i} dt$$

$$= \frac{\left(\sum_{i=1}^{N} n_i\right)!}{2r_{\max} N^{1+\Sigma_{i=1}^{N} n_i} \prod n_i!}$$

Before moving on to compute the evidence assuming a peak is present in the window, we note we can do a parameter fitting on $r_0$:

$$\hat{r}_0 = \frac{\sum n_i}{N} \quad (76)$$

This can now be used in the parameter fitting for the case there is a peak in the window.

We now consider how to detect a peak using a given peak shape. The model $M_1$ in this case is that, within the window, there is a peak in the presence of dark current:

$$p(n|M_1) = \int\int p(n|a, r_0, M_1) p(a, r_0|M_1) da\, dr_0 \quad (77)$$

$$= \int\int e^{-Nr_0} e^{-a} \prod_{i=1}^{N} \frac{(ax_i + r_0)^{n_i}}{n_i!} \frac{1}{r_{\max} a_{\max}} da\, dr_0$$

$$= \frac{1}{r_{\max} a_{\max} \prod_{i=1}^{N} n_i!} \int\int e^{-Nr_0} e^{-a} \prod_{i=1}^{N} (ax_i + r_0)^{n_i} da\, dr_0$$

The integral in (77) is over the parameter plane $(\alpha, r_0)$, the term $$\prod_{i=1}^{N} (ax_i + r_0)^{n_i}$$

is of problematic when the peak is comparable to dark current. However, as we are looking for strong evidences of peaks in the spectrum, and $$\prod_{i=1}^{N}(ax_i+r_0)^{n_i}$$

will be dominated by the peak even $\alpha x_i$ is just slightly larger than $r_0$ due the power of $n_i$, and vice versa. Thus we can neglect a very narrow region close to the diagonal of $ar_0$-plane, thereby approximating (77) as:

$$p(n|M_1) \approx p(n|M_1') = p(n|\text{only a peak in the window}) + \qquad (78)$$
$$p(n|\text{only dark current in the window})$$
$$= p(n|\text{only a peak in the window}) +$$
$$p(n|M_0)$$

where model $M_1'$ is an approximation of model $M_1$: there is either only dark current or only a peak in the window. Hence the ratio in (10) becomes:

$$\frac{p(H_1|n)}{p(H_0|n)} \approx \frac{p(n|M_1')}{p(n|M_0)} = 1 + \frac{p(n|\text{only a peak in the window})}{p(n|M_0)} \qquad (79)$$

where $p(n|\text{only a peak in the window})$ can be computed with the same fashion as $p(n|M_0)$, where only dark current is assumed in the window, but with a different prior:

$$p(a, r_0|\text{only peak}) = \frac{\delta(r_0)}{2a_{\max}} \qquad (80)$$

This results in:

$$p(n|\text{only a peak in the window}) = \frac{(\prod x_i^{n_i})(\sum n_i)!}{2a_{\max}(\prod n_i!)} \qquad (81)$$

We are then ready to evaluate the ratio in (79).

2.2.2 Parameter Fitting

With above ratio (79) computed, if model $M_1'$ is more preferable, the parameter, i.e. the amplitude, can be estimated by maximizing the likelihood function (71), using the dark current estimated from the tail of the spectrum where there is no peak. The natural logarithm of likelihood function (71) is:

$$L = \log[p(n|a, \hat{r}_0, M_1)] \qquad (82)$$
$$= -Nr_0 - a + \sum n_i \log(\hat{r}_0 + ax_i) - \sum n_i \log(n_i!)$$

To maximize it:

$$\frac{\partial L}{\partial a} = -1 + \sum n_i \frac{x_i}{r_0 + ax_i} = 0 \qquad (83)$$

Note $\alpha x_i \gg \hat{r}_0$ if there is a peak, the $\hat{r}_0$ in the denominator is then negligible, which results in:

$$a_0 \approx \sum_{k=1}^{N} n_k \qquad (84)$$

This is our best estimate of the amplitude of the peak. It should be noted that this approximation is not good for very small peaks.

3. Derivation of the Line Shape for TOF-SIMS Mass Peaks

The TOF-SIMS is a counting experiment and it (typically) counts the arrival times of one ion at a time. For any given ionization pulse, there will be only a few ions of a given mass that reach the detector. Hence, the eventual pulse shape will be the accumulation of many independent experiments, with the origin of time t=0 for each experiment being the arrival time of the beam pulse that initiates the ion formation. We consider a single ion of mass M that emerges from a typical beam pulse. After passing through what could be very complicated ion optics that performs charge/mass segregation, at a time $t=t_1$ (that is mass-dependent) this ion enters free flight with a velocity $v_0$, which is also mass-dependent. We assume the ion enters free flight at z=0 and travels a distance L to the detector along a linear trajectory $z(t)=v_0(t-t_1)$. We then ask what the PDF of arrival times for this ion would be if the PDF in the particle phase space at time $t_1$ is $$f(z,v^*,t=t_1)=f_0(z,v)=\delta(z)g(v). \qquad (85)$$

Here, $f(z,v^*,t)dzdv$ is the probability at time t that the particle lies in an infinitesimal neighborhood of the point (z, v) in phase space and we allow for an uncertainty in the ions initial velocity, but $g(v)$ is assumed to be sharply peaked around $v_0$. For f to be a PDF we must have $\int dvg(v)=1$. This PDF evolves according to the Fokker-Planck equation, which in the present situation is simply $$\frac{\partial f}{\partial t} + v\frac{\partial f}{\partial z} = 0, \qquad (86)$$

implying that $$f(z,v^*,t)=f_0(z-vt,v)=\delta(z-v(t-t_1))g(v). \qquad (87)$$

The PDF of arrival times at the detector placed at z=L is given by the flux of probability crossing this point, which is $$P(t)dt = \int dv(vdt)f(z=L, v; t) = \frac{L}{(t-t_1)^2}g\left(\frac{L}{t-t_1}\right)dt. \qquad (88)$$

We suggest the use of a Gaussian for the velocity distribution $g(v)$ from maximum entropy arguments: when assigning a PDF for the outcome of what will be the single case of a repeated series of identical and independent experiments, one should choose that PDF which maximizes the number of possible outcomes that are consistent with the probability assignment. Thus, the choice of a Gaussian here is based on the desire to minimize bias in the outcome, not on physical arguments requiring 'thermalization' in the ionization process or the nature of the ion optics.

To summarize, our proposed peak (wavelet) shape is $$x(t;M) = \frac{L}{(t-t_1(M))^2} \exp\left[-\frac{\left(\frac{L}{t-t_1(M)} - v_0(M)\right)^2}{2\sigma^2(M)}\right]. \quad (89)$$

4. Results on TOF-SIMS

TOF-SIMS is an abbreviation for Time-of-Flight Secondary Ionization Mass Spectrometer. It uses a high energy primary ion beam to probe the sample surface. Poisson noise is associated with this case.

Figure 2:
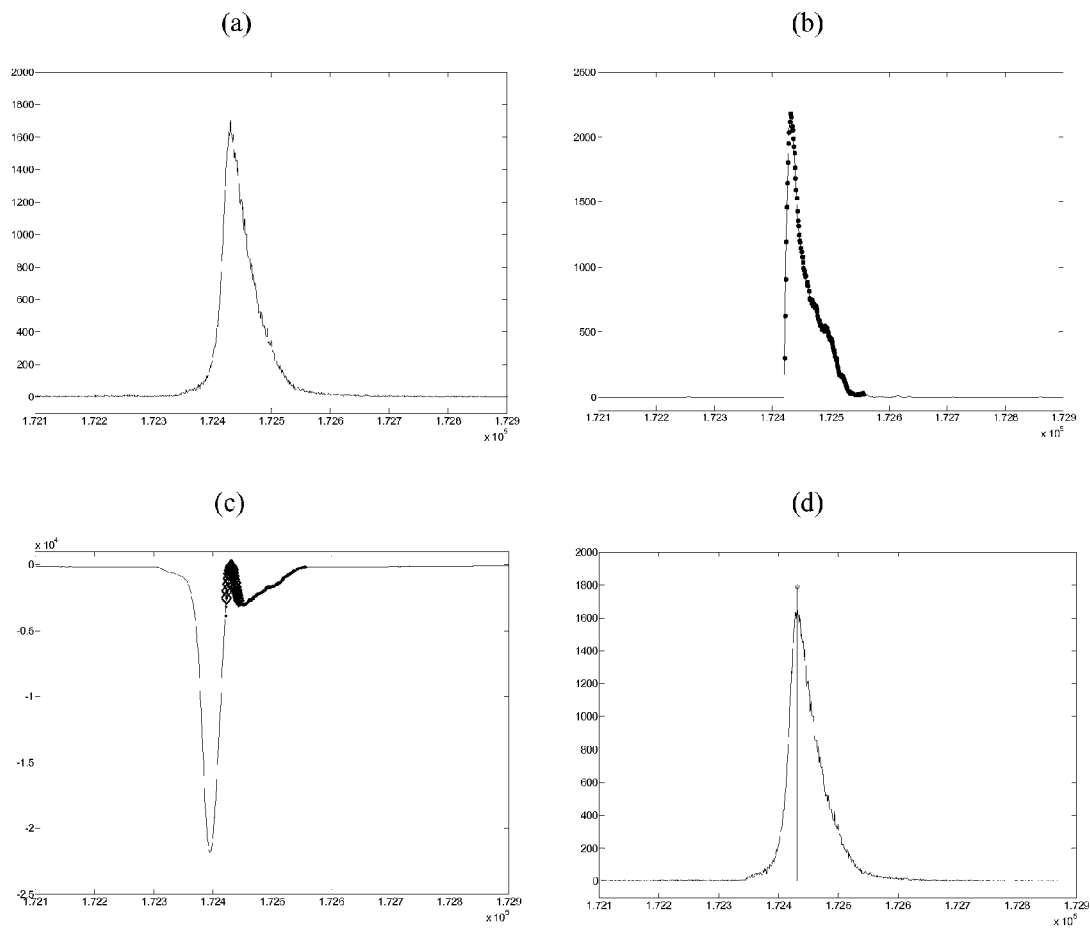
FIG. 2 shows four panels from a TOF-SIMS spectrum, with each successive panel corresponding to successive manipulations of the data.

Here we illustrate our results for finding peaks in a spectrum. FIG. 2 shows the work flow for a TOF-SIMS mass spectrum (silver foil, gallium beam). In FIG. 2a, a segment of data containing only one peak from a spectrum is plotted. A window is then run through these data point by point with the ratio of two hypotheses (i.e., equation ((79)) being computed for each window, resulting in the curve shown in FIG. 2b. Meanwhile, the maximum likelihood estimation of amplitude and the maximized likelihood are also computed. The maximized likelihood is plotted as the curve in FIG. 2c. Then, a threshold is set (e.g., athreshold of 20 was used for the illustrated case) for the ratio with the points above this threshold being marked as dots in FIG. 2b. Points at corresponding positions are also marked in FIG. 2c. Of those dots in the likelihood plot, illustrated in FIG. 2c, only a fraction (i.e., the diamonds) are selected to fit locally to a parabola, from which the position of the peak is determined. Then the amplitude of the peak is chosen from the estimated amplitude according to the peak position. The peak so-determined is overlapped with the original data in FIG. 2d, but is scaled so that it can be fitted in to the panel.

Figure 3:
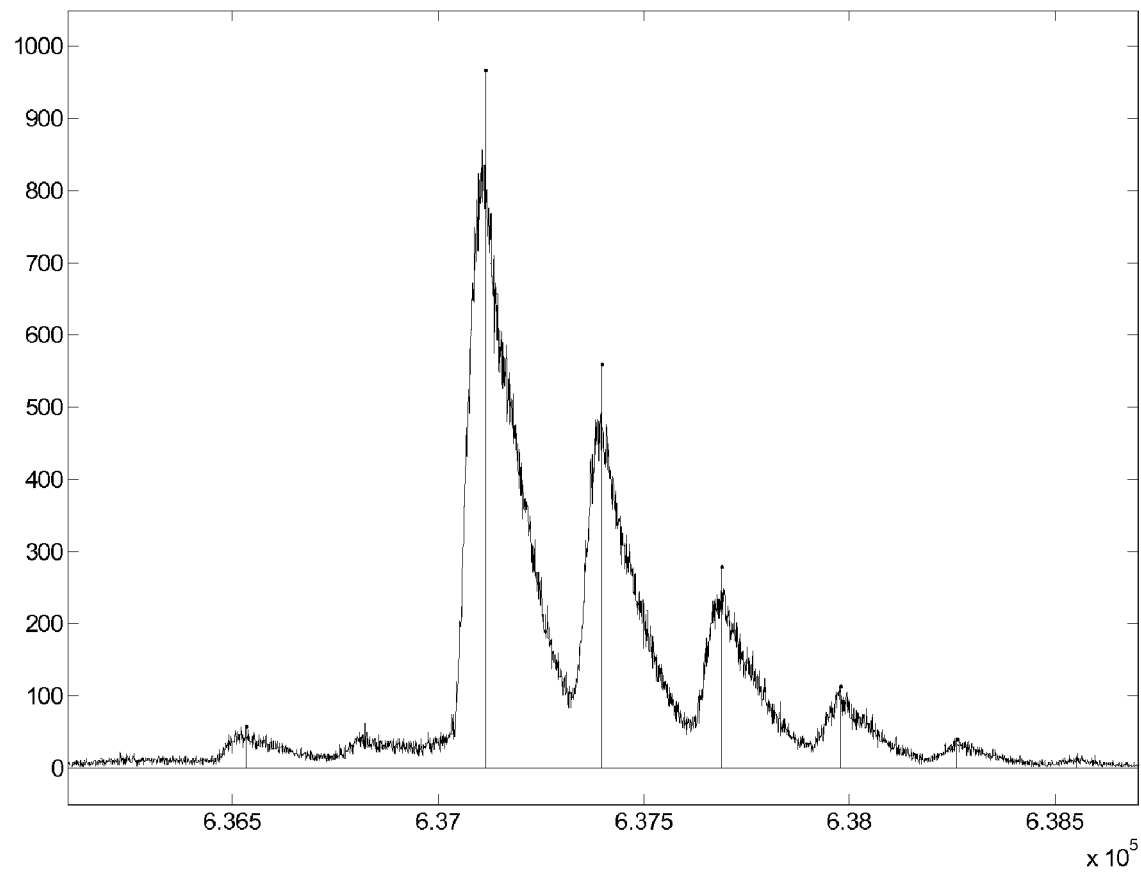
FIG. 3 depicts a small portion of a TOF/SIMS spectrum of angiotensin.

FIG. 3 depicts a segment of a TOF-SIMS spectrum of angiotensin (silver foil, gallium beam), with the y-axis corresponding to counts and the x-axis corresponding to time points. The data segments shows four continuous peaks (corresponding to the raw data) arising from isotopes, along with the peaks identified after applying the methods of the invention.

The peak identification method described herein is potentially useful in any data set wherein peaks of interest are distinguished. The method described herein is useful for identifying peaks in data sets obtained from spectroscopy, including but not limited to various forms of absorption and emission spectroscopy, including absorption spectroscopy, UV/VIS spectroscopy, IR spectroscopy, X-ray spectroscopy, X-ray crystallography, Nuclear Magnetic Resonance spectroscopy (NMR), and raman spectroscopy. In particular, the methods described herein are useful for applications in mass spectroscopy, including TOF-SIMS and SELDI-MS. For example, the methods described herein are useful for analyzing TOF-SIMS mass spectroscopic data related to proteomics. The methods described herein are not limited to spectroscopic applications; for example, the methods are useful when used for imaging applications.

We claim:

1. An automated method of data processing and evaluation comprising the steps of:
    (a) selecting a data set having a plurality of peaks contained therein;
    (b) developing a hypothesis which predicts a specified number of peaks present within a given window of said data set;
    (c) testing the hypothesis that the specified number of peaks is present within the given window;
    (d) maximizing a likelihood function to estimate the position and amplitude of said peaks present within the given window;
    (e) repeating said steps (b)–(d) for each of a plurality of windows with each of said windows partially overlapping a previous one of said windows wherein peak amplitudes and corresponding positions in said data set are generated using the position and amplitude of said peaks present within each given window so-estimated by each said step of maximizing; and
    (f) outputting said peak amplitudes and said corresponding positions to an output device.

2. The method of claim 1, wherein said step of outputting comprises the step of displaying said peak amplitudes and said corresponding positions.

3. The method of claim 2, wherein said step of displaying includes the step of overlaying said peak amplitudes and said corresponding positions on a graphic image of said data set.

4. An automated method of data processing and evaluation comprising the steps of:
    (a) selecting a data set having a plurality of peaks contained therein, wherein said data set is obtained from time-of-flight mass spectra;
    (b) developing a hypothesis which predicts a specified number of peaks present within a given window of said data set;
    (c) testing the hypothesis that the specified number of peaks is present within the given window;
    (d) maximizing a likelihood function to estimate the position and amplitude of said peaks present within the given window;
    (e) repeating said steps (b)–(d) for each of a plurality of windows with each of said windows partially overlapping a previous one of said windows wherein peak amplitudes and corresponding positions in said data set are generated using the position and amplitude of said peaks present within each given window so-estimated by each said step of maximizing; and
    (f) outputting said peak amplitudes and said corresponding positions to an output device.

5. The method of claim 4, wherein said step of outputting comprises the step of displaying said peak amplitudes and said corresponding positions.

6. The method of claim 5, wherein said step of displaying includes the step of overlaying said peak amplitudes and said corresponding positions on a graphic image of said data set.

* * * * *